US011981451B2

(12) United States Patent
van Dijk et al.

(10) Patent No.: US 11,981,451 B2
(45) Date of Patent: *May 14, 2024

(54) SYSTEMS AND METHODS TO COMBINE TAXI AND LANDING LIGHTS FOR AN AIRCRAFT IN THE SAME HOUSING AS A CAMERA

(71) Applicant: Daedalean AG, Zurich (CH)

(72) Inventors: Luuk Adriaan Cornelis van Dijk, Bellinzona (CH); Boris Ivov Videnov, Zurich (CH); Mathias Robin Widmer, Wil (CH)

(73) Assignee: Daedalean AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,731

(22) Filed: Jun. 23, 2023

(65) Prior Publication Data
US 2023/0348098 A1 Nov. 2, 2023

Related U.S. Application Data

(63) Continuation of application No. 17/709,118, filed on Mar. 30, 2022, now Pat. No. 11,724,822.

(51) Int. Cl.
*B64D 47/04* (2006.01)
*B60Q 1/14* (2006.01)
*B60R 1/22* (2022.01)
*B64D 47/08* (2006.01)

(52) U.S. Cl.
CPC ............ *B64D 47/04* (2013.01); *B60Q 1/143* (2013.01); *B64D 47/08* (2013.01); *B60R 1/22* (2022.01); *B64D 2203/00* (2013.01)

(58) Field of Classification Search
CPC .... B64D 47/04; B64D 47/08; B64D 2203/00; B64D 47/02; B60Q 1/143; B60R 1/22
See application file for complete search history.

(56) References Cited

U.S. PATENT DOCUMENTS

| 8,666,570 | B1* | 3/2014 | Tillotson | G06T 7/0008 |
| | | | | 701/28 |
| 9,584,791 | B1* | 2/2017 | Whalen | G01C 23/00 |
| 9,643,736 | B1* | 5/2017 | Ell | G06V 20/54 |
| 2008/0137353 | A1* | 6/2008 | Larsen | B64D 47/04 |
| | | | | 362/470 |
| 2015/0138355 | A1* | 5/2015 | Tillotson | G08G 5/0021 |
| | | | | 348/144 |
| 2021/0119484 | A1* | 4/2021 | Birks | B60R 16/03 |
| 2021/0298158 | A1* | 9/2021 | Liu | B64D 47/02 |
| 2022/0197115 | A1* | 6/2022 | Vialatte | B64D 47/06 |

* cited by examiner

*Primary Examiner* — Abdullah A Riyami
*Assistant Examiner* — Syed M Kaiser
(74) *Attorney, Agent, or Firm* — Esplin & Associates, PC

(57) ABSTRACT

Systems and methods to combine lights and cameras are disclosed. Exemplary implementations may carry a housing that holds both a lighting component and a video camera; receive instructions to operate the lighting component in at least one of two different lighting modes, including a landing lighting mode and a taxi lighting mode; control the video camera to capture video information at a particular frame rate; and control the lighting component to emit light in a manner that supports at least one particular lighting mode and that includes switching off or turning down the lighting component in synchrony with the particular frame rate to reduce glare and/or otherwise improve the captured video information.

20 Claims, 6 Drawing Sheets

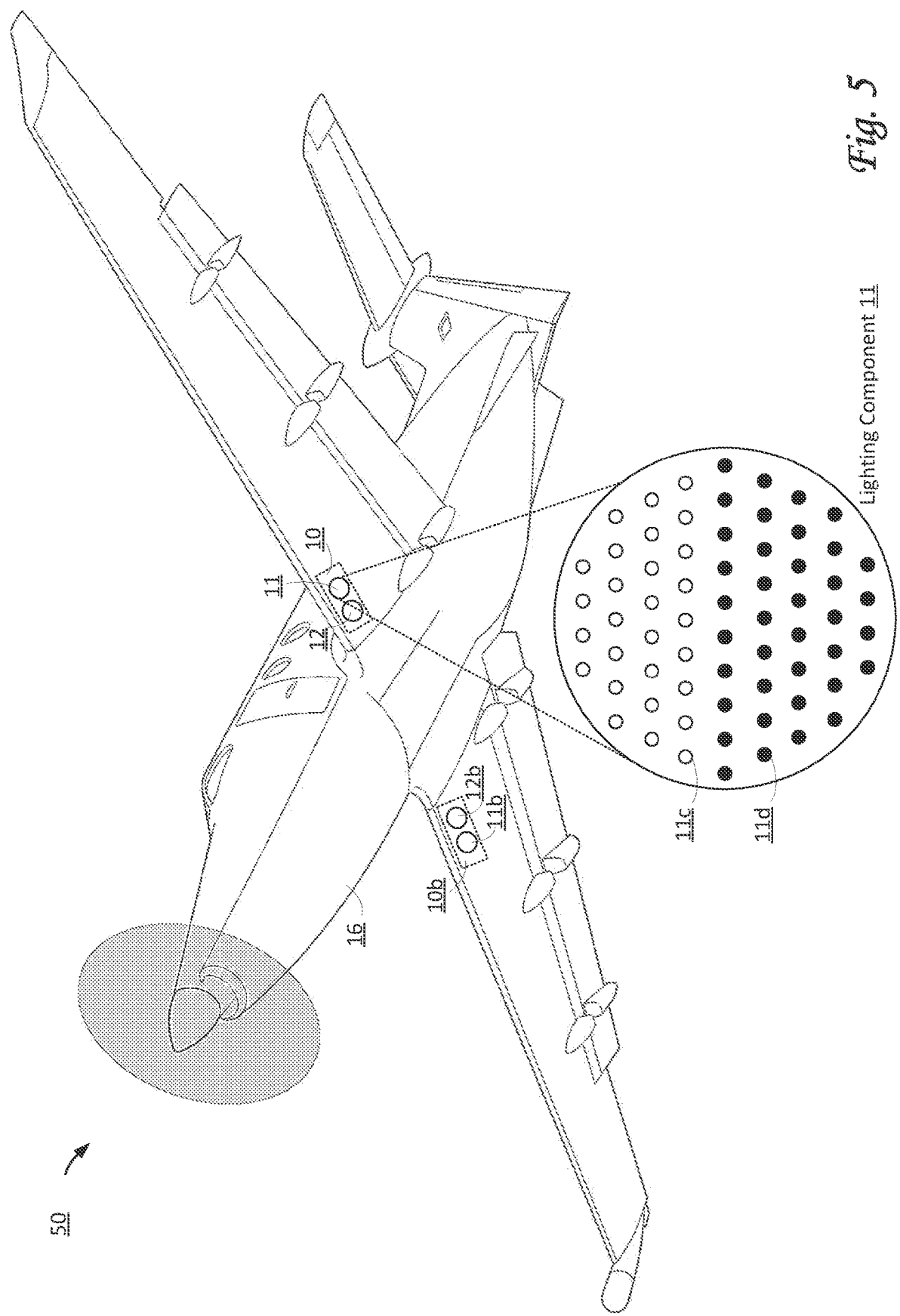

SYSTEMS AND METHODS TO COMBINE TAXI AND LANDING LIGHTS FOR AN AIRCRAFT IN THE SAME HOUSING AS A CAMERA

FIELD OF THE DISCLOSURE

The present disclosure relates to systems and methods to combine taxi and landing lights for an aircraft in the same housing as a video camera.

BACKGROUND

Aircraft are known. Different types of lights for aircraft are known, including, but not limited to, taxi lights and landing lights. Combining two different types of lighting components in proximity of each other, e.g., on a wing of an aircraft or near the connection of a wing to the fuselage, is known.

SUMMARY

One aspect of the present disclosure relates to a system to combine lights and cameras for an aircraft, particularly an aircraft that supports taxiing. The system may include a housing that holds both a lighting component and a video camera. The system may include one or more hardware processors configured by machine-readable instructions. The system may be configured to receive instructions to operate the lighting component in at least one of two different lighting modes, including a landing lighting mode and a taxi lighting mode. The system may be configured to control the video camera to capture video information at a particular frame rate. The system may be configured to control the lighting component to emit light in a manner that supports at least one particular lighting mode and that includes switching off or turning down the lighting component in synchrony with the particular frame rate to reduce glare and/or otherwise improve the captured video information.

Another aspect of the present disclosure related to a method of combining lights and cameras for an aircraft, particularly an aircraft that supports taxiing. The method may include carrying a housing that holds both a lighting component and a video camera. The method may include receiving instructions to operate the lighting component in at least one of two different lighting modes, including a landing lighting mode and a taxi lighting mode. The method may include controlling the video camera to capture video information at a particular frame rate. The method may include controlling the lighting component to emit light in a manner that supports at least one particular lighting mode and that includes switching off or turning down the lighting component in synchrony with the particular frame rate to reduce glare and/or otherwise improve the captured video information.

As used herein, any association (or relation, or indication, or correspondency, or correlation) involving aircraft, servers, processors, client computing platforms, users, housings, sensors, lighting components, cameras, output signals, instructions, notifications, determinations, transfers, presentations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates an aircraft carrying multiple lighting components and multiple video cameras, in accordance with one or more implementations.

DETAILED DESCRIPTION

Figure 1:
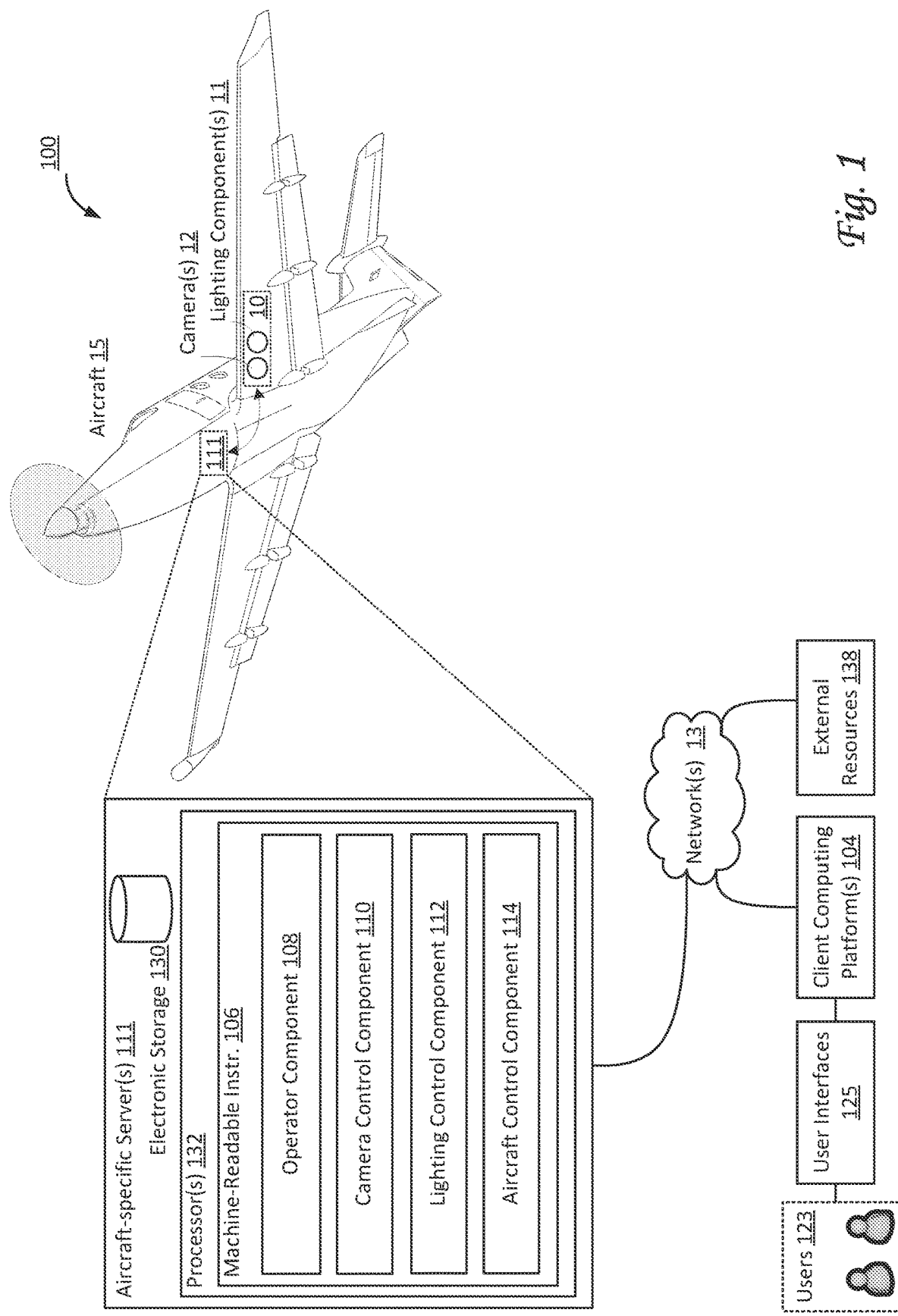
FIG. 1 illustrates a system configured to combine lights and cameras for aircraft, in accordance with one or more implementations.

FIG. 1 illustrates a system 100 configured to combine lights and cameras for aircraft, e.g., for a particular aircraft 15, in accordance with one or more implementations. As a preliminary and non-limiting example, by virtue of the systems and methods described in this disclosure, system 100 combines one or more lights (e.g., lighting component 11) with one or more video cameras (e.g., video camera 12) for particular aircraft 15 such that one or more video cameras can be added to an aircraft that supports having separate but proximate lights (or lighting components) for at least two different lighting modes, such as taxi lights and landing lights (e.g., for particular aircraft 15 that supports taxiing). The lighting mode for taxiing may be referred to as the taxi lighting mode. The lighting mode for landing may be referred to as the landing lighting mode. In some cases, the landing lighting mode may also be used as the lighting mode during takeoff. By operating and/or otherwise controlling lighting component(s) 11 and video camera(s) 12 in a particular synchronized manner as described in this disclosure, quality video information can be captured by video camera(s) 12 without undue interference from lighting component(s) 11 during the two or more different lighting modes.

Aircraft 15 may include a set of sensors configured to generate a set of output signals. One or more of the sensors may convey (a particular type of) flight data. Flight data is any information related to and/or relevant to the operation of aircraft 15, in particular during flight. One or more of the sensors may convey one or more different types of data that are different from the flight data. The sensors may include one or more video cameras 12. In some implementations, video camera 12 may be configured to capture video information and/or other flight data. The sensors may include one or more of an altimeter, an airspeed sensor, a compass, and/or other sensors. For example, sensor data may include one or more of positional information for aircraft 15 (e.g., global positioning system (GPS) information such as GPS coordinates), location information regarding geographical locations of aircraft 15, information regarding presence of other aircraft (e.g., during active flight), Automatic Dependent Surveillance-Broadcast (ads-b) information (In and/or Out), radar and/or flight alarm (FLARM) information, Traffic Alert and Collision Avoidance System (TCAS) information, lowest selectable speed (VLS) information, instrument read-out information for aircraft (e.g., altimeter, airspeed, compass, etc.), timing information, and/or other aircraft-specific information related to aircraft 15.

In some implementations, aircraft 15 may support autonomous flight control. Alternatively, and/or simultaneously, in some cases, aircraft 15 may support pilot assistance, in particular non-autonomous pilot assistance or, in other words, assisted flight control. By way of non-limiting example, aircraft 15 may be a vertical takeoff and landing (VTOL) vehicle, or an electric VTOL aircraft. In some implementations, aircraft 15 may include certain types of helicopters, drones, unmanned aerial vehicles (UAVs), non-fixed-wing aircraft, and/or other aircraft that support at least two different lighting modes.

System 100 may include one or more aircraft-specific server(s) 111 (depicted in FIG. 1 as a dotted rectangle to indicate this component may be embedded within aircraft 15, and not readily visible from the outside), a housing 10 (depicted in FIG. 1 as a dotted rectangle to indicate this component may be embedded within aircraft 15, and may not be easily or readily visible from the outside), one or more lighting components 11 (which may be held by housing 10), one or more video cameras 12 (which may be held by housing 10), client computing platform(s) 104, user interface(s) 125, external resource(s) 138, and/or other components. Users 123 (also referred to as users) may include one or more of a first user, a second user, and/or other users. For example, the users may include a human aircraft operator, a machine-based aircraft operator (e.g., an autonomous aircraft operating algorithm for the types of aircraft that support autonomous flight control and/or a pilot assistance algorithm for the types of aircraft that support pilot assistance, in particular non-autonomous pilot assistance), a remote aircraft operator, a fleet manager managing a fleet of aircraft, and/or other users. As used in descriptions herein, any use of the term "user" may refer to user(s) 123, unless indicated otherwise. In some implementations, system 100 may include one or more aircraft, such as aircraft 15.

As depicted in FIG. 1, aircraft-specific server 111 may include one or more of electronic storage 130, one or more (hardware) processors 132, machine-readable instructions 106, and/or other components. Aircraft-specific server(s) 111 may be configured by machine-readable instructions 106. Machine-readable instructions 106 may include one or more instruction components. Instruction components (for any set of machine-readable instructions) may include computer program components. The instruction components may include one or more of an operator component 108, a camera control component 110, a lighting control component 112, an aircraft control component 114, and/or other instruction components.

Aircraft-specific server(s) 111 may be configured to communicate with one or more client computing platforms 104 according to a client/server architecture and/or other architectures. Client computing platform(s) 104 may be configured to communicate with other client computing platforms via aircraft-specific server(s) 111 and/or according to a peer-to-peer architecture and/or other architectures. Users may access system 100 via client computing platform(s) 104. In some implementations, system 100 and/or aircraft-specific server(s) 111 may be configured to communicate with users 123 and/or with other entities and/or components, e.g., through one or more networks 13. The depiction of any component as a dotted rectangle is not meant to be limiting.

Lighting component 11 may be configured to emit light in at least two different lighting modes. In some implementations, the different lighting modes include a landing lighting mode, a taxi lighting mode, and/or other lighting modes. Lighting component 11 may include one or more light-emitting diodes (LEDs). For example, in some implementations, a single lighting component 11 may include a set of multiple lighting elements, including but not limited to a set of multiple LEDs, for example. In some implementations, a set of lighting elements within lighting component 11 may include multiple distinct subsets of lighting elements such that the subsets are mutually exclusive. Operation of lighting component 11 may be controlled by lighting control component 112.

By way of non-limiting example, FIG. 5 illustrates a view 50 of an aircraft carrying multiple lighting components and video cameras, for which a particular lighting component 11 includes a set of multiple lighting elements (including a first LED light 11c and a second LED light 11d) within lighting component 11. As indicated by either white or black circles, in FIG. 5, the set of multiple lighting elements may be divided into two subsets of lighting elements, such that a first subset includes first LED light 11c and a second subset includes second LED light 11d. For example, the first subset of lighting elements may be used to emit light in a first lighting mode (e.g., in the landing lighting mode), and the second subset of lighting elements may be used to emit light in a second lighting mode (e.g., in the taxi lighting mode). Alternatively, in some implementations, individual ones of the multiple lighting elements within lighting component 11 may be controlled individually based on the current lighting mode, such that individual lighting elements contribute to the light emitted in multiple different lighting modes. Individual lighting elements may be configured such that they can be turned on and turned off in a period shorter (by at least half in some implementations) than the frame duration of the current frame rate of video camera(s) 12. For example, certain types of LED lights may be suitable, but certain types of incandescent lights may not be.

In some implementations, lighting component 11 may be configured to emit an amount of light similar to a parabolic aluminized reflector (PAR) 36 light. In some implementations, lighting component 11 may be configured to emit an amount of light within 1 order of magnitude of the amount of light emitted by a parabolic aluminized reflector (PAR) 36 light.

Video camera 12 may be configured to capture video information. For example, video camera 12 may capture video information at a particular range of frame rates. For example, the particular range of frame rates may be between 5 and 60 frames per second, between 10 and 120 frames per second, between 6 and 30 frames per second, about 20 frames per second, about 30 frames per second, less than 20 frames per second, less than 30 frames per second, less than 60 frames per second, and/or other (range of) frame rates. In some implementations, aircraft 15 may include 2, 3, 4, or more video cameras. An individual video camera may have a resolution of about 6 Mpixel/frame, about 8 Mpixel/frame, about 10 Mpixel/frame, about 12 Mpixel/frame, about 15 Mpixel/frame, about 20 Mpixel/frame, and/or another resolution. Individual pixels may use 8 bits, 10 bits, 12 bits, 16 bits, 20 bits, 24 bits, 32 bits, and/or another number of bits per pixel. Operation of video camera 12 may be controlled by camera control component 110. Video camera(s) may include one or more (electronic and/or mechanical) shutters (not depicted in FIG. 1) that control when video information is captured. For example, electronic shutters may be operated by controlling a sensor (or sensor chip), without moving mechanical components.

Housing 10 may be configured to be carried by aircraft 15. Housing 10 may be configured to hold both of lighting component(s) 11 and video camera(s) 12. In some implementations, aircraft 15 may include multiple housings similar to or the same as housing 10. By way of non-limiting example, FIG. 5 illustrates an aircraft carrying multiple lighting components and multiple video cameras. As depicted, a first housing 10 may be disposed on one side of fuselage 16 of aircraft 15 (here, the left side), and a second housing 10b may be disposed on the opposite side of fuselage 16 of aircraft 15 (here, the right side). For example, housing 10b may be configured to hold a second lighting component 11b and a second video camera 12b. In some cases, a housing may be referred to as a bay.

Figure 6A:
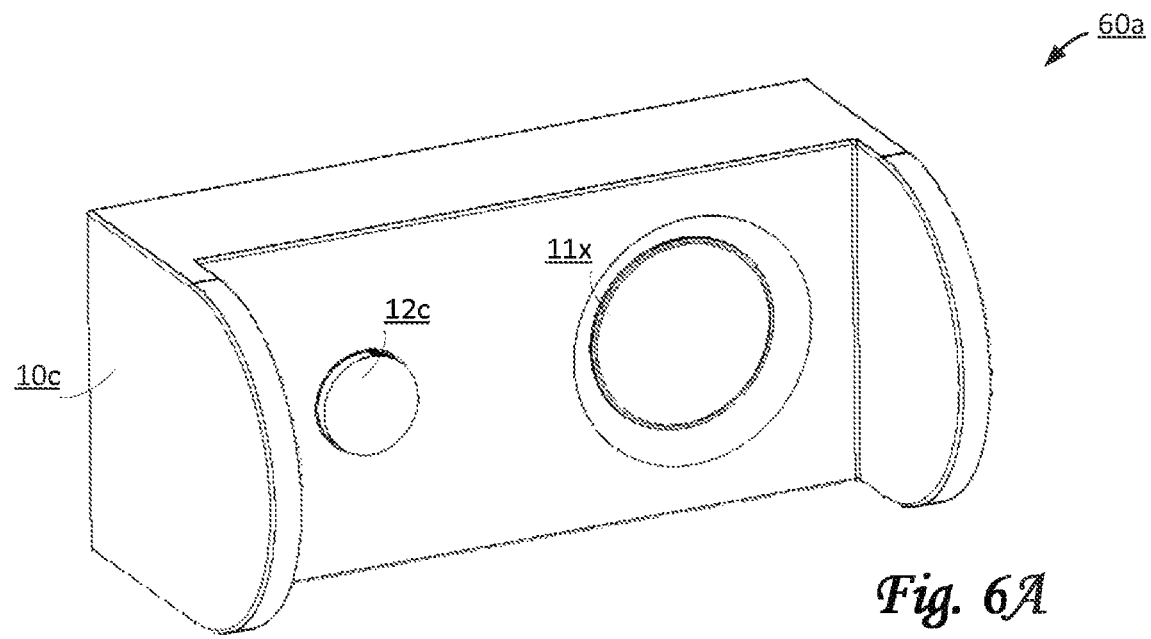
FIGS. 6A-6B illustrates views of an exemplary housing for a combination of a lighting component and a video camera, as may be used in a system configured to combine lights and cameras for aircraft, in accordance with one or more implementations.
Figure 6B:
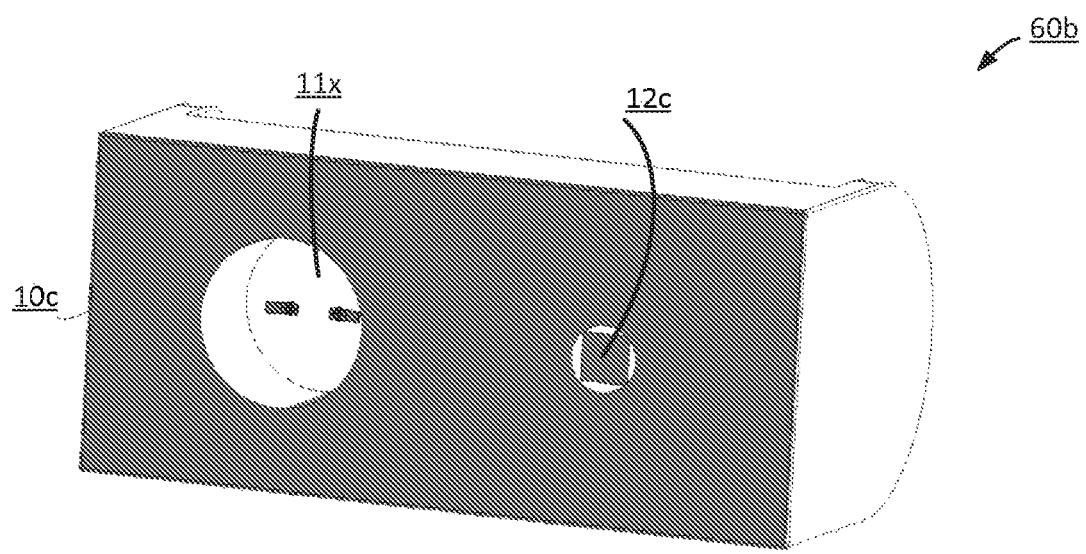

By way of non-limiting example, FIG. 6A illustrates a front view 60a of a housing 10c. Housing 10c may be configured to be carried by an aircraft. Housing 10c may be configured to hold both a lighting component and a video camera. As depicted, housing may include an opening 12c configured to hold a video camera, and a lighting component 11x. By way of non-limiting example, FIG. 6B illustrates a rear view 60b of housing 10c, including opening 12c and lighting component 11x. The distance between the center of opening 12c and the center of lighting component 11x may be (less than) 12 inches, (less than) 2 feet, (less than) 20 cm, (less than) 30 cm, (less than) 40 cm, (less than) 50 cm, and/or another distance.

Figure 4:
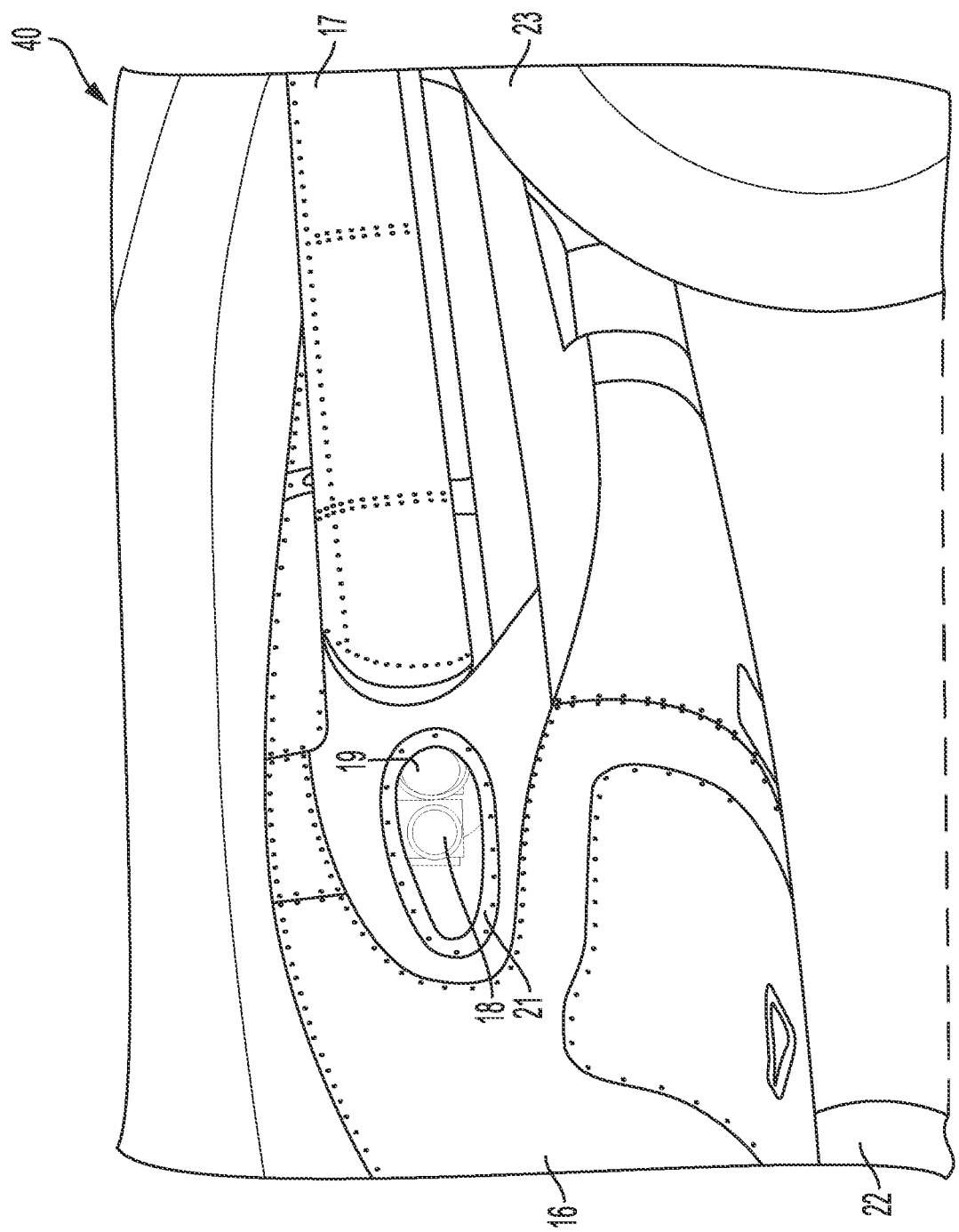
FIG. 4 illustrates a partial view of an aircraft with multiple lights.

Commonly on aircraft, a light or lighting component such as a landing light or taxiing light may be protected from exposure to the elements, debris, weather, vibrations, and/or other potential sources of damage by a transparent protective structure (i.e., a cover). For example, such a cover could be made from glass or plastic. By way of non-limiting example, FIG. 4 illustrates a partial view 40 of an aircraft with multiple lights, including a landing light 18, a taxiing light 19, a fuselage 16, a (left) wing 17, a wheel 22, an engine 23, and/or other components. As depicted, landing light 18 and taxiing light 19 are positioned near the area of engagement between wing 17 and fuselage 16, and these lights are disposed within a few inches of each other. As depicted, landing light 18 and taxiing light 19 are protected behind a transparent protective structure 21. If an aircraft such as the depicted aircraft in FIG. 5 were to be modified by adding a (video) camera near either of landing light 18 or taxiing light 19, the emitted light might interfere with the captured image information. By way of non-limiting example, emitted light might interact with transparent protective structure 21 (causing glare, reflections, distortions, and/or other undue interference). In some implementations, aircraft 15 may include a transparent protective structure to protect lighting component 11 and/or video camera 12. In some implementations, lighting component 11 and video camera 12 may be disposed within a particular proximity of each other. For example, the particular proximity may be (less than) 12 inches, (less than) 2 feet, (less than) 20 cm, (less than) 30 cm, (less than) 40 cm, (less than) 50 cm, and/or another distance.

Operator component 108 may be configured to receive, interpret, and/or otherwise handle instructions to operate lighting component 11, video camera 12, and/or other components of system 100 or aircraft 15. In some implementations, a particular instruction may be received from an aircraft operator (e.g., through a user interface of aircraft 15). In some implementations, a particular instruction may be received from an autonomous aircraft operator (e.g., from an autonomous aircraft operating algorithm of aircraft 15). For example, a particular instruction may be to operate lighting component 11 in one or more particular lighting modes. For example, a given instruction may be to operate lighting component 11 in the landing lighting mode of operation. Another instruction may be to operate lighting component 11 in the taxi lighting mode of operation. In some implementations, a specific instruction may be to operate lighting component 11 in both the landing lighting mode of operation and the taxi lighting mode of operation at the same time.

Figure 3A:
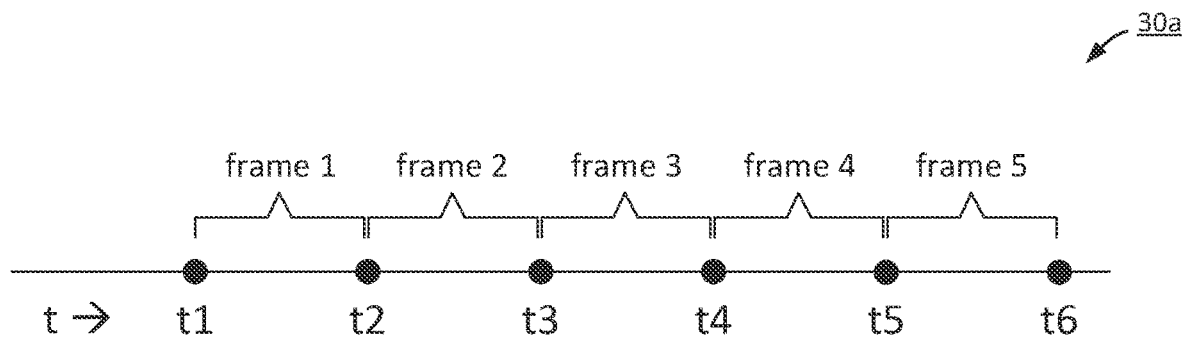
FIGS. 3A-3B illustrate exemplary timelines for a sequence of frames as may be used in a system configured to combine lights and cameras for aircraft, in accordance with one or more implementations.

Camera control component 110 may be configured to control video camera(s) 12. Camera control component 110 may control video camera 12 to capture video information at a particular frame rate. For example, the particular frame rate may fall within any of the ranges of frame rates disclosed herein. For example, in some cases, the particular frame rate may be 20 fps. For example, in some cases, the particular frame rate may be 30 fps. Video camera 12 and/or camera control component 110 may be configured to control one or more shutters of video camera 12 to operate at specific moments and/or intervals. By way of non-limiting example, FIG. 3A illustrates a timeline 30a for a sequence of frames during which video information may be captured. For example, timeline 30a as shown may include different moments marked by t1-t2-t3-t4-t5-t6. The duration or distance between subsequent moments may correspond to individual frames. For example, frame 1 extends between t1 and t2, frame 2 extends between t2 and t3, and so forth. For example, a frame rate of 20 fps corresponds to a frame duration of 50 ms. As another example, a frame rate of 10 fps corresponds to a frame duration of 100 ms, and so forth.

Lighting control component 112 may be configured to control lighting component(s) 11. Control of lighting component 11 may include turning lighting component 11 on and off. In some implementations, control of lighting component 11 may include turning subsets or individual lighting elements within lighting component 11 on and off. Control of lighting component 11 may include reducing the amount of light emitted by lighting component 11. In some implementations, control of lighting component 11 may include reducing the amount of light emitted by subsets or individual lighting elements within lighting component 11. Control of lighting component 11 may include controlling lighting elements included in lighting component 11, either individually, as a subset, and/or as a group. Control by lighting control component 112 may be configured to operate in synchrony with the current frame rate of video camera 12. For example, by switching off and/or reducing light emitted when the shutter(s) of video camera(s) 12 allow capturing of video information (i.e., are activated and/or open), the subsequently captured video information includes less interference (or little to no undue interference) caused by light emitted by lighting component 11. For example, during the capture by video camera(s) 12 of video information, lighting control component 112 may control lighting component 11 to emit between 0% and 5% of the smallest amount of light emitted during any lighting mode when light is actively being emitted. In some implementations, during the capture by video camera(s) 12 of video information, lighting control component 112 may control lighting component 11 to emit between 0% and 5% of the amount of light emitted during the landing lighting mode, when the shutter(s) of video camera(s) 12 are deactivated and/or closed. In some implementations, during the capture by video camera(s) 12 of video information, lighting control component 112 may control lighting component 11 to emit between 0% and 5% of the amount of light emitted during the taxi lighting mode, when the shutter(s) of video camera(s) 12 are deactivated and/or closed.

Figure 3B:
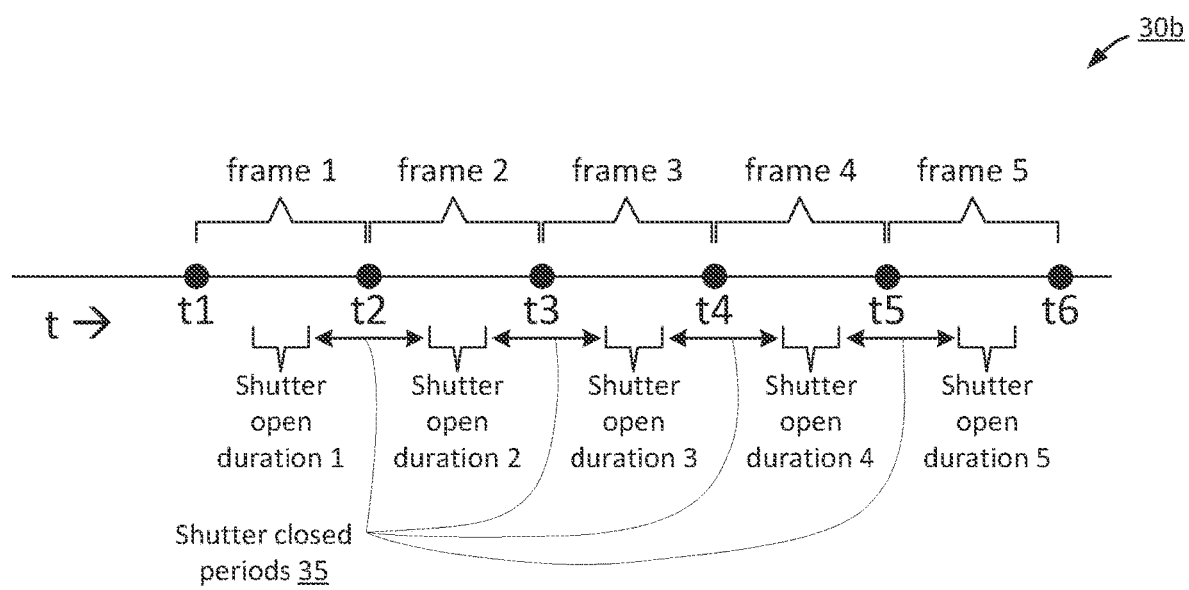

By way of non-limiting example, FIG. 3B illustrates a timeline 30b for a sequence of frames during which video information may be captured and during which a lighting component may be controlled. For example, timeline 30b as shown may include different moments marked by t1 t2 t3 t4 t5 t6. The duration or distance between subsequent moments may correspond to individual frames. For example, frame 1 extends between t1 and t2, frame 2 extends between t2 and t3, and so forth. During a portion of the individual frames, the shutter(s) of video camera(s) 12 may be open/activated such that video information may be captured. For example, during frame 1, a shutter may be open/activated during the portion marked "Shutter open duration 1". For example, during frame 2, the shutter may be open/activated during the portion marked "Shutter open duration 2", and so forth. By way of non-limiting example, during a frame duration of 50 ms (for a frame rate of 20 fps), the shutter(s) of video camera(s) may be open/activated and/or capturing video information for a duration of less than 50 ms, such as, say, 20 ms. Accordingly, for this example, between subsequent portions marked "Shutter open duration", there are periods labeled "Shutter closed periods 35", during which no video information is captured, and during which lighting component 11 may be turned on (here, for about 30 ms). A third party viewing lighting component 11 while repeatedly turning on and off may not notice any flickering if the pertinent rate is sufficiently high, due to limitations of human vision.

Operations and/or control by lighting control component 112 may be based on (or responsive to) operations by operator component 108. For example, responsive to an instruction received by operator component 108 to operate lighting component 11 in the landing lighting mode, lighting control component 112 may control lighting component 11 to emit a first amount of light in a first manner that supports taking off and landing of aircraft 15. For example, responsive to an instruction received by operator component 108 to operate lighting component 11 in the taxi lighting mode, lighting control component 112 may control lighting component 11 to emit a second amount of light in a second manner that supports taxiing of aircraft 15. The first manner of emitting light may be different from the second manner of emitting light. In some implementations, the first amount of light may be different from the second amount of light. In some implementations, the light emitted in the landing lighting mode may have a different brightness (e.g., measured as an amount of lumen) than the light emitted in the taxi lighting mode. In some implementations, the light emitted in the landing lighting mode may be emitted in a different direction than the light emitted in the taxi lighting mode. In some implementations, the light emitted in the landing lighting mode may have a different color than the light emitted in the taxi lighting mode. In some implementations, the light emitted in the landing lighting mode may have a different narrowness of the emitted beam than the light emitted in the taxi lighting mode. In other words, the (horizontal) angle width of the produced beam may be different between the landing lighting mode and the taxi lighting mode. For example, the beam produced for the landing lighting mode may be narrower than the beam produced for the taxi lighting mode.

Aircraft control component 114 may be configured to control operations of aircraft 15, including but not limited to flight. In some implementations, aircraft control component 114 may provide and/or support autonomous flight control, e.g., through an autonomous aircraft operating algorithm. In some implementations, aircraft control component 114 may provide and/or support pilot assistance, e.g., through a pilot assistance algorithm. In some implementations, such algorithms may be used during takeoff or landing (including but not limited to landing guidance). In some implementations, such algorithms may be used to detect and/or avoid obstacles in the air, including but not limited to other aircraft. In some implementations, such algorithms may be used for navigation and positioning while in the air (without relying on GPS).

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates interaction with aircraft 15.

Referring to FIG. 1, in some implementations, client computing platform(s) 104, aircraft-specific servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which client computing platform(s) 104, aircraft-specific servers 111, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104.

External resources 138 may include sources of information outside of system 100, external entities participating with system 100, external providers of computation and/or storage services (e.g., a publicly accessible server external to system 100), external providers of relevant information (e.g., flight scheduling information, weather information, navigation information, etc.), and/or other resources. In some implementations, some or all of the functionality attributed herein to external resources 138 may be provided by resources included in system 100. In some implementations, one or more external resources 138 may provide information to other components of system 100.

Aircraft-specific server(s) 111 may include communication lines, or ports to enable the exchange of information with a network and/or other computing platforms. Illustration of aircraft-specific server(s) 111 in FIG. 1 is not intended to be limiting. Aircraft-specific server(s) 111 may include a plurality of hardware, software, and/or firmware components operating together to provide the functionality attributed herein to aircraft-specific server(s) 111. For example, aircraft-specific server(s) 111 may be implemented by a cloud of computing platforms operating together.

Electronic storage 130 may comprise non-transitory storage media that electronically stores information. The electronic storage media of electronic storage 130 may include one or both of system storage that is provided integrally (i.e., substantially non-removable) with aircraft-specific server(s) 111 and/or removable storage that is removably connectable to aircraft-specific server(s) 111 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from aircraft-specific server(s) 111, information received from client computing platform(s) 104, and/or other information that enables aircraft-specific server(s) 111 to function as described herein. Electronic storage 130a may be similar to electronic storage 130 as described elsewhere in this disclosure, though included in aircraft-specific servers 111, as depicted in FIG. 1.

Processor(s) 132 may be configured to provide information processing capabilities in aircraft-specific server(s) 111. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, and/or 114, and/or other components. Processor(s) 132 may be configured to execute components 108, 110, 112, and/or 114, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within one processing unit, this is exemplary. In implementations in which processor(s) 132 and/or processor(s) 132 include multiple processing units, one or more of components 108, 110, 112, and/or 114 may be implemented remotely from the other components. The description of the functionality provided by the different components 108, 110, 112, and/or 114 described below is for illustrative purposes only, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 132 may be configured to execute one or more additional components that may perform some or all of the functionality attributed below to one of components 108, 110, 112, and/or 114.

Figure 2:
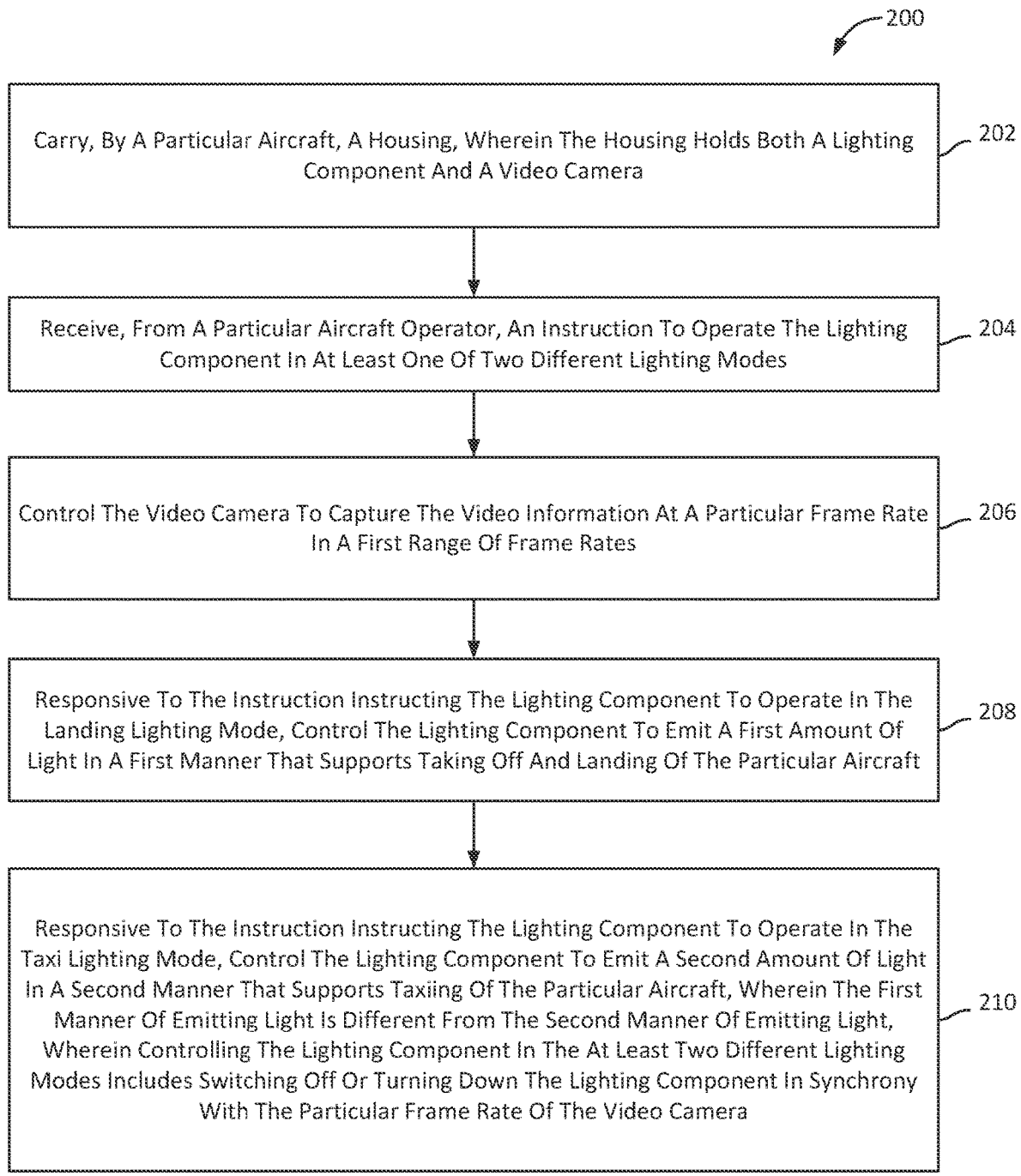
FIG. 2 illustrates a method of combining lights and cameras for aircraft, in accordance with one or more implementations.

FIG. 2 illustrates a method 200 of combining lights and cameras for a particular aircraft, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a housing is carried by a particular aircraft. The housing holds both a lighting component and a video camera. The lighting component emits light in at least two different lighting modes. The at least two different lighting modes include a landing lighting mode and a taxi lighting mode. The video camera captures video information at a first range of frame rates. In some embodiments, operation 202 is performed by an aircraft the same as or similar to aircraft 15 (shown in FIG. 1 and described herein).

At an operation 204, an instruction is received, from a particular aircraft operator, to operate the lighting component in at least one of the at least two different lighting modes. In some embodiments, operation 204 is performed by an operator component the same as or similar to operator component 108 (shown in FIG. 1 and described herein).

At an operation 206, the video camera is controlled to capture the video information at a particular frame rate in the first range of frame rates. In some embodiments, operation 206 is performed by a camera control component the same as or similar to camera control component 110 (shown in FIG. 1 and described herein).

At an operation 208, responsive to the instruction instructing the lighting component to operate in the landing lighting mode, controlling the lighting component to emit a first amount of light in a first manner that supports taking off and landing of the particular aircraft. In some embodiments, operation 208 is performed by a lighting control component the same as or similar to lighting control component 112 (shown in FIG. 1 and described herein).

At an operation 210, responsive to the instruction instructing the lighting component to operate in the taxi lighting mode, the lighting component is controlled to emit a second amount of light in a second manner that supports taxiing of the particular aircraft. The first manner of emitting light is different from the second manner of emitting light. Controlling the lighting component in the at least two different lighting modes includes switching off or turning down the lighting component in synchrony with the particular frame rate of the video camera such that the video information is captured by the video camera at moments when the lighting component emits between 0% and 5% of the second amount of light emitted in the taxi lighting mode. In some embodiments, operation 210 is performed by a lighting control component the same as or similar to lighting control component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to control a lighting component and a video camera carried by a particular aircraft, wherein the lighting component is configured to emit light in at least a first and a second lighting mode, wherein the video camera is configured to capture video information at a particular frame rate, wherein the particular aircraft is operated by a particular aircraft operator, the system comprising:
one or more hardware processors configured by machine-readable instructions to:
responsive to the lighting component operating in the first lighting mode, control the lighting component to emit a first amount of light in a first manner;
responsive to the lighting component operating in the second lighting mode, control the lighting component to emit a second amount of light in a second manner, wherein the first manner of emitting light is different from the second manner of emitting light;
wherein control of the lighting component in the first and the second lighting mode includes switching off or turning down the lighting component in synchrony with the particular frame rate of the video camera such that the video information is captured by the video camera at moments when the lighting component emits between 0% and 5% of the first amount of light.

2. The system of claim 1, wherein the first lighting mode supports taking off and landing of the particular aircraft, and wherein the second lighting mode supports taxiing of the particular aircraft.

3. The system of claim 1, wherein the one or more hardware processors are further configured to:
control the video camera to capture the video information at the particular frame rate.

4. The system of claim 1, wherein the one or more hardware processors are further configured to:
receive, from the particular aircraft operator, an instruction to operate the lighting component in the first lighting mode; and
control the lighting component to operate in the first lighting mode.

5. The system of claim 1, wherein the one or more hardware processors are further configured to:
receive, from the particular aircraft operator, a second instruction to operate the lighting component in the second lighting mode; and
control the lighting component to operate in the second lighting mode.

6. The system of claim 1, wherein the lighting component and the video camera are held in a housing that is carried by the particular aircraft.

7. The system of claim 6, further comprising the particular aircraft, the housing, the lighting component, and the video camera.

8. The system of claim 1, wherein the lighting components includes a set of lighting elements, wherein the set of lighting elements includes a first subset of lighting elements and a second subset of lighting elements, and wherein individual ones of the set of lighting elements are light-emitting diode (LED) lights.

9. The system of claim 8, wherein controlling the lighting component to emit the first amount of light in the first manner includes controlling the first subset of lighting elements, and wherein controlling the lighting component to emit the second amount of light in the second manner includes controlling the second subset of lighting elements.

10. The system of claim 1, wherein the first amount of light is greater than the second amount of light,
wherein the first manner of emitting light produces a first beam having a first angle width,
wherein the second manner of emitting light produces a second beam having a second angle width, wherein the first angle width is different from the second angle width.

11. A method of controlling a lighting component and a video camera carried by a particular aircraft, wherein the lighting component emits light in at least a first and a second lighting mode, wherein the video camera captures video information at a particular frame rate, wherein the particular aircraft is operated by a particular aircraft operator, the method comprising:
responsive to the lighting component operating in the first lighting mode, controlling the lighting component to emit a first amount of light in a first manner; and
responsive to the lighting component operating in the second lighting mode, controlling the lighting component to emit a second amount of light in a second manner, wherein the first manner of emitting light is different from the second manner of emitting light,
wherein controlling the lighting component in the first and the second lighting modes includes switching off or turning down the lighting component in synchrony with the particular frame rate of the video camera such that the video information is captured by the video camera at moments when the lighting component emits between 0% and 5% of the first amount of light.

12. The method of claim 11, wherein the first lighting mode supports taking off and landing of the particular aircraft, and wherein the second lighting mode supports taxiing of the particular aircraft.

13. The method of claim 11, further comprising:
controlling the video camera to capture the video information at the particular frame rate.

14. The method of claim 11, further comprising:
receiving, from the particular aircraft operator, an instruction to operate the lighting component in the first lighting mode; and
controlling the lighting component to operate in the first lighting mode.

15. The method of claim 11, further comprising:
receiving, from the particular aircraft operator, a second instruction to operate the lighting component in the second lighting mode; and
controlling the lighting component to operate in the second lighting mode.

16. The method of claim 11, wherein the lighting component and the video camera are held in a housing that is carried by the particular aircraft.

17. The method of claim 11, wherein the lighting components includes a set of lighting elements, wherein the set of lighting elements includes a first subset of lighting elements and a second subset of lighting elements.

18. The method of claim 17, wherein individual ones of the set of lighting elements are light-emitting diode (LED) lights.

19. The method of claim 18, wherein controlling the lighting component to emit the first amount of light in the first manner includes controlling the first subset of lighting elements, and wherein controlling the lighting component to emit the second amount of light in the second manner includes controlling the second subset of lighting elements.

20. The method of claim 11, wherein the first amount of light is greater than the second amount of light,
wherein the first manner of emitting light produces a first beam having a first angle width,
wherein the second manner of emitting light produces a second beam having a second angle width,
wherein the first angle width is different from the second angle width.

* * * * *